United States Patent
Hugosson

(10) Patent No.: US 11,934,516 B2
(45) Date of Patent: Mar. 19, 2024

(54) METHOD AND SYSTEM FOR ENABLING SECURE PROCESSING OF DATA USING UNTRUSTED PROCESSING APPLICATION IN A TRUSTED EXECUTION ENVIRONMENT

(71) Applicant: Axis AB, Lund (SE)

(72) Inventor: Fredrik Hugosson, Lund (SE)

(73) Assignee: AXIS AB, Lund (SE)

( * ) Notice: Subject to any disclaimer, the term of this patent is extended or adjusted under 35 U.S.C. 154(b) by 30 days.

(21) Appl. No.: 17/888,720

(22) Filed: Aug. 16, 2022

(65) Prior Publication Data
US 2023/0070484 A1    Mar. 9, 2023

(30) Foreign Application Priority Data
Sep. 6, 2021    (EP) ................................. 21194959

(51) Int. Cl.
G06F 21/53 (2013.01)
H04L 9/08 (2006.01)

(52) U.S. Cl.
CPC ............ *G06F 21/53* (2013.01); *H04L 9/0825* (2013.01)

(58) Field of Classification Search
CPC .............................. G06F 21/53; H04L 9/0825
USPC ...................................................... 713/152
See application file for complete search history.

(56) References Cited

U.S. PATENT DOCUMENTS

| | | | |
|---|---|---|---|
| 2008/0285756 A1* | 11/2008 | Chuprov | H04L 63/062 380/277 |
| 2013/0227303 A1* | 8/2013 | Kadatch | H04L 63/0478 713/193 |
| 2020/0012803 A1 | 1/2020 | Mannan et al. | |

(Continued)

FOREIGN PATENT DOCUMENTS

| | | | | |
|---|---|---|---|---|
| CN | 111262694 A | | 6/2020 | |
| CN | 111917540 A | * | 11/2020 | ........... G06F 21/602 |

(Continued)

OTHER PUBLICATIONS

Extended European Search Report dated Feb. 4, 2022 for European Patent Application No. 21194959.9.

(Continued)

*Primary Examiner* — Moeen Khan
(74) *Attorney, Agent, or Firm* — Volpe Koenig

(57) ABSTRACT

A non-transitory computer-readable storage medium, a secure application framework, a system, and a computer implemented method for enabling secure processing of data are disclosed. The method comprises steps performed within a secure application framework running in a trusted execution environment. The data encrypted using a first random key are received, the first random key is received in a secure way, and the encrypted data is decrypted using the first random key. The data are then input to the processing application, the processing application is executed to process the input data, and output data are received from the processing application. A second random key is generated, the output data are encrypted using the second random key, the second random key is encrypted using a public key of a storage device, and the encrypted output data and the encrypted second random key are sent to the storage device.

12 Claims, 5 Drawing Sheets

(56) References Cited

U.S. PATENT DOCUMENTS

2020/0175138 A1\* 6/2020 Nordstrom .............. H04L 63/06
2021/0167972 A1\* 6/2021 Zang ................... H04L 63/0823

FOREIGN PATENT DOCUMENTS

KR 10-2017-0136406 A 12/2017
WO 2019/227208 A1 12/2019

OTHER PUBLICATIONS

Menezes et al., "Handbook of Applied Cryptography," Chapter 12—Key Establishment Protocols (Oct. 1996).

\* cited by examiner

METHOD AND SYSTEM FOR ENABLING SECURE PROCESSING OF DATA USING UNTRUSTED PROCESSING APPLICATION IN A TRUSTED EXECUTION ENVIRONMENT

FIELD OF INVENTION

The present disclosure relates to secure processing of encrypted data, and specifically to enabling secure processing of data when using an untrusted processing application. Such secure processing is enabled by executing the untrusted processing application by a secure application framework running in a trusted execution environment.

TECHNICAL BACKGROUND

In applications where an authorized party wants to process data which is encrypted, such as video data or other image data captured in a camera and stored in an encrypted form, security issues arise when processing applications for which security cannot be ensured. For example, since the encrypted data first need to be decrypted before running the processing application, it cannot be ensured that the processing application does not make any decrypted data accessible to unauthorized parties. Furthermore, it may be difficult, cumbersome, or even not allowed to adapt the processing applications to ensure security. Solutions have been suggested using homomorphic encryption where the processing application can process encrypted data without decryption and provide a result that is also encrypted. However, such solutions are computation heavy and are not applicable to all algorithms.

SUMMARY

Providing a computer implemented method, a secure application framework, and a system for enabling secure processing of data using an untrusted processing application configured to process the data which overcome or mitigate issues in known methods and systems would be beneficial.

According to a first aspect, a computer implemented method for enabling secure processing of data using a processing application configured to process the data is provided. The method is performed within a secure application framework running in a trusted execution environment and comprises receiving the data encrypted using a first random key, receiving the first random key in a secure way and decrypting the encrypted data using the first random key, thereby obtaining the data. The method further comprises inputting the data to the processing application, executing the processing application to process the input data, and receiving output data from the processing application. The method further comprises generating a second random key, encrypting the output data using the second random key, encrypting the second random key using a public key of a storage device, and sending the encrypted output data and the encrypted second random key to the storage device.

The trusted execution environment is a secure environment in a processing device. The trusted execution environment offers an execution space that provides an increased level of security in relation to an untrusted execution environment, such as a standard operating system. An application executed in the trusted execution environment is isolated such that the privacy of the code and any data of the application is ensured.

The secure application framework is configured to control all input to and output from the processing application. By running the secure application framework in the trusted execution environment, it can be ensured that decrypted data cannot be leaked outside the trusted execution environment from the processing application.

By receiving the first random key in a secure way is meant that the first random key is received in a way such that the privacy of the first random key is secured, i.e., such that the first random key is not leaked in unencrypted form to an unauthorized party. This may for example be achieved by means of receiving the first random key in encrypted form or via a secure channel.

According to a second aspect, a non-transitory computer-readable storage medium having stored thereon instructions for implementing the method according to the first aspect, when executed by a system having processing capabilities.

According to a third aspect, a secure application framework configured to be run in a trusted execution environment is provided. The secure application framework is configured to execute an encrypted data receiving function configured to receive data encrypted using a first random key, a secure key receiving function configured to receive the first random key in a secure way, and a data decrypting function configured to decrypt the encrypted data using the first random key, thereby obtaining the data. The secure application framework is further configured to execute an inputting function configured to input the data to the processing application, an executing function configured to execute the processing application to process the input data, and an output data receiving function configured to receive output data from the processing application. The secure application framework is further configured to execute a second random key generating function configured to generate a second random key, an output data encrypting function configured to encrypt the output data using the second random key, a second random key encrypting function configured to encrypt the second random key using a public key of a storage device, and an encrypted output data sending function configured to send the encrypted output data and the encrypted second random key to the storage device.

According to a fourth aspect, a system is provided comprising the secure application framework according to the second aspect, and a device comprising a secure module. The secure module is configured to execute a storage device key generating function configured to generate a private/public key pair for the storage device, an encrypted key receiving function configured to receive the first random key encrypted using the public key of the storage device, a first random key decrypting function configured to decrypt the first random key using the private key of the storage device, and a secure key sending function configured to send the first random key in a secure way to the secure application framework.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the systems described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present disclosure will now be described in more detail, with reference to appended figures. The figures should not be considered limiting but are instead used for explaining and understanding. Like reference numerals refer to like elements throughout.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Rather, these embodiments are provided for thoroughness and completeness, and to convey the scope of the disclosure to the skilled person.

Figure 1:
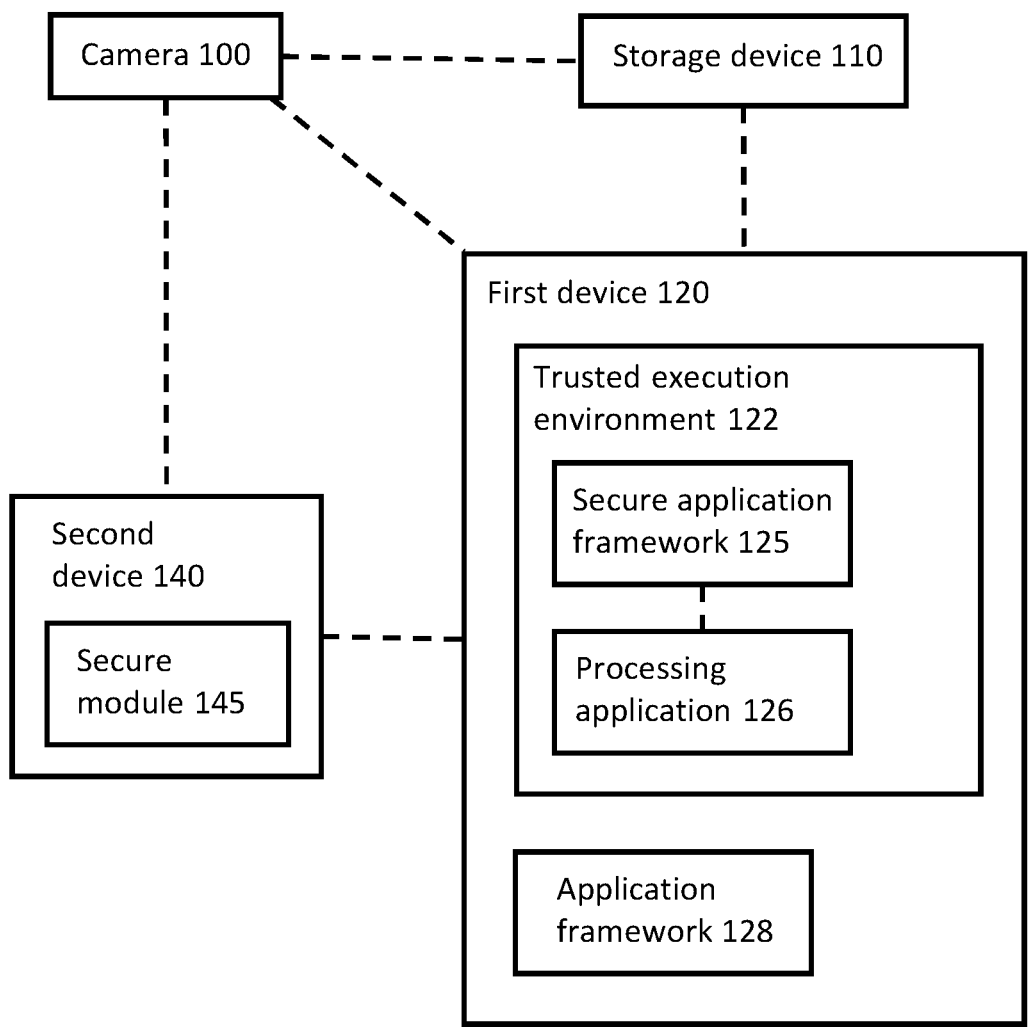
FIG. 1 is a schematic block diagram of an example system in which embodiments of the present disclosure may be implemented.

FIG. 1 is a schematic block diagram of an example system in which embodiments of the present disclosure may be implemented. Data in the form of video data or other image data are captured in a camera 100 and encrypted by means of a random key. The encrypted data are then sent from the camera 100 to and stored in a storage device 110, which may be located at the camera 100 or at a different location. As the data are encrypted by means of the random key, the data may be stored securely at the storage device 110 even if the party operating the storage device 110 is different from the party owning the camera 100. Furthermore, the camera 100 is connected to a second device 140 comprising a secure module 145 in which a private/public key pair for the storage device 110 is generated and the public key of the private/public key pair for the storage device 110 is provided from the second device 140 to the camera 100. The camera 100 may then wrap (encrypt) the random key with the public key for the storage device 110 into a key envelope. The key envelope (random key encrypted with the public key for the storage device 110) is then sent to and stored in the storage device 110. The random key is then typically thrown away in the camera 100. If a processing application 126 configured to process the data, e.g., analyse or adapt the data, is to be used, for which processing application 126 the privacy of the data cannot be ensured, embodiments of a secure application framework 125, and a method and system in relation to the same, are provided as described in the following in relation to FIGS. 2 to 5. The secure application framework 125 is configured to be run in a trusted execution environment 122 which may be located in a first device 120. The secure application framework 125 is typically implemented in software and executed in the trusted execution environment 122. The secure application framework 125 is responsible for the execution of the processing application 126, which is also executed in the trusted execution environment 122. The secure application framework 125 is loaded and initiated by software in an application framework 128 executed outside the trusted execution environment 122.

It is to be noted that the storage device 110, first device 120 and the second device 140 do not have to be separate devices. For example, the secure application framework 125 may be run in the trusted execution environment 122 configured as a secure area of a regular processor (not shown) of the storage device 110 and the second device 140 may be a separate chip in the storage device 110 connected to the processor of the storage device 110.

Embodiments of a computer implemented method 200 for enabling secure processing of data using a processing application 126 configured to process the data will now be described in relation to FIG. 2. The embodiments of the method may for example be implemented in a system as described in relation to FIG. 1.

According to embodiments of the method 200 the following steps are performed within a secure application framework 125 running in a trusted execution environment 122, such as an open portable TEE (OP-TEE). First, the data are received S210 encrypted using a first random key. The first random key is then received S215 in a secure way, and the encrypted data are decrypted S220 using the first random key. By this, the data are obtained in a decrypted form and input S225 to the processing application 126. The processing application 126 is then executed S230 to process the input data. The processing may be any type of processing such as analysis of the data or adapting of the data. The data may for example be video data. Analysis may then relate to analysis of movement of people for creation of a heatmap of the movement, and adapting may be masking of faces, e.g., by pixelization.

The processing application 126 is executed by the secure application framework 125. Since the processing application 126 is running in the trusted execution environment 122, only a limited number of functions are allowed for the processing application 126 and these are executed by the secure application framework 125. Since the secure application framework 125 is running in the trusted execution environment 122, it can also be ensured that no data other than those controlled by the secure application framework 125 can be provided from the processing application 126 to outside the trusted execution environment 122.

Once the processing application 126 has processed the input data, output data from the processing application 126 are received S235. The output data typically includes the result of the processing. A second random key is then generated S240 and the output data are encrypted S245 using the second random key. The second random key is then encrypted S250 using a public key of a storage device 110. Another way of formulating this is that the second random key is wrapped with the public key of the storage device 110 into a key envelope. Finally, the encrypted output data and the encrypted second random key are sent S255 to the storage device 110 for storing.

Figure 2:
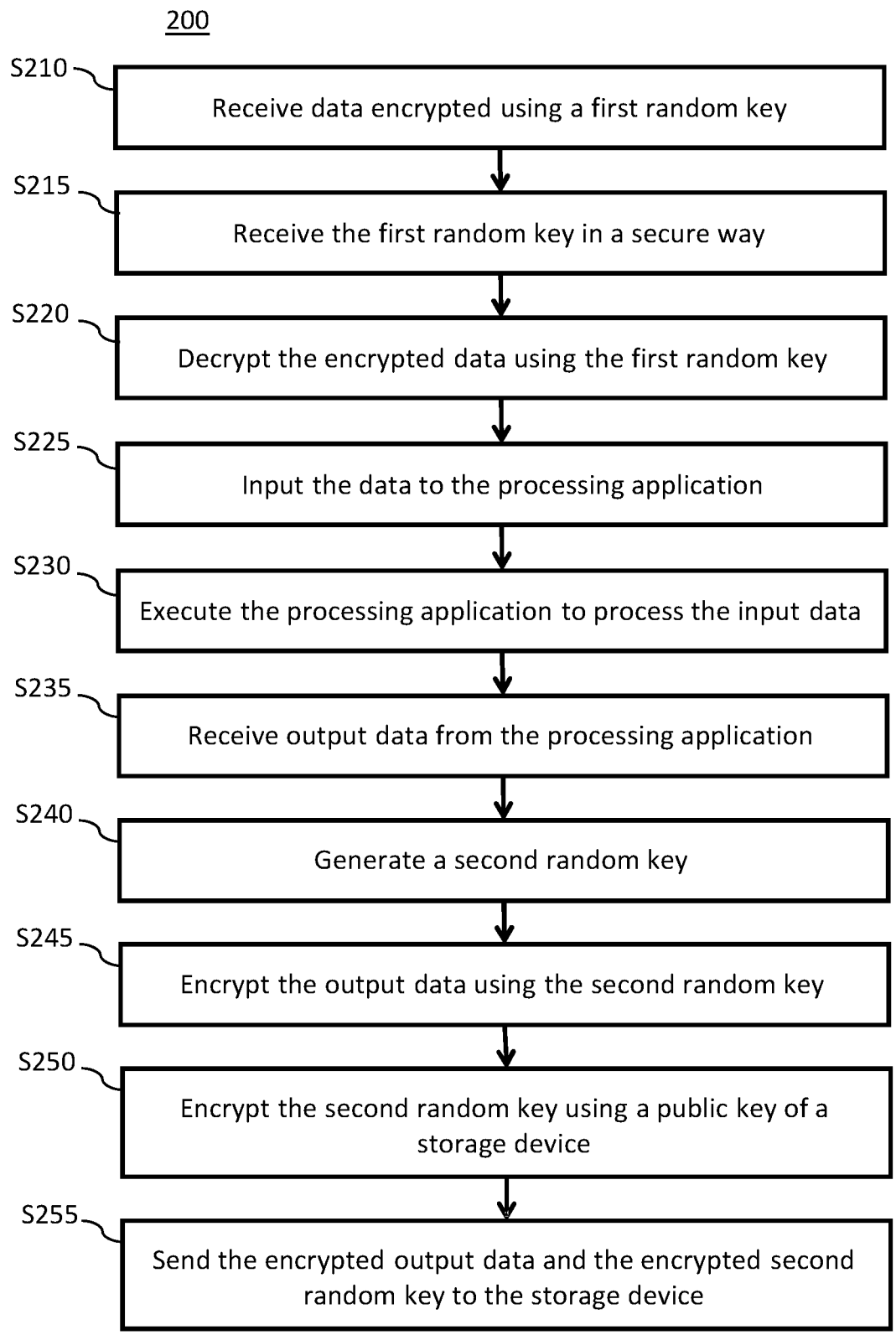
FIG. 2 is a flow chart of embodiments of a method for enabling secure processing of data using a processing application configured to process the data.

It is to be noted that the order of the steps in FIG. 2 are not necessarily performed in the order indicated in the flow chart. Specifically, a step that is not indicated to depend on input from a previous step may be performed prior to that previous steps. Similarly, a step that is not indicated to provide output to a later step may be performed after that later step.

Within the secure application framework 125 a request may be made to another device, e.g., a device in which a private/public key pair for the storage device 110 are generated, such as a device 140 comprising a secure module 145, to provide the public key of the storage device 110. The public key of the storage device 110 is then received in the secure application framework 125.

The device 140 comprising the secure module 145 may be any device including a module that enables handling of sensitive data with a level of security required by the relevant application, such as a function or chip inside the storage device 110. The secure module 145 is a module that is able to manage private/public key pairs in a secure way such that leaking of the public key or other sensitive data to unauthorized parties is prevented. Specifically, the secure module 145 is a module that is able to generate private/public key pairs, to decrypt data, such as a random key, encrypted with the public key of the generated private/public key pair and to send the decrypted data in a secure way to another device. By sending the data in a secure way is meant that the data is sent in a way such that the privacy of the data is secured, i.e., such that the data is not leaked in unencrypted form to an unauthorized party.

The secure module 145 may for example be a trusted platform module (TPM) or a secure element (SE). The secure module 145 may be realized in hardware or software, or a combination of both.

Within the device 140 comprising the secure module 145, a private/public key pair for the storage device 110 may be generated. Furthermore, the first random key which is encrypted using the public key of the storage device 110 may be received, e.g., from the storage device 110, and be decrypted using the private key of the storage device 110 in the device 140 comprising the secure module 145. The first random key may then be sent in a secure way to the secure application framework 125.

Sending the first random key in a secure way to the secure application framework 125 may for example be achieved by means of sending the first random key in encrypted form or via a secure channel (not shown).

When sending the first random key in encrypted form, a private/public key pair for the processing application 126 is first generated in the secure application framework 125 running in the trusted execution environment 122. The public key of the processing application 126 is then sent to the device 140 comprising the secure module 145. In the device 140 comprising the secure module 145, the first random key is encrypted using the public key of the processing application 126, and the first random key encrypted using the public key of the processing application 126 is sent to the secure application framework 125. In the secure application framework 125, the first random key is then decrypted using the private key of the processing application 126.

When sending the first random key via a secure channel, a secure channel may be established for communication between the device 140 comprising the secure module 145 and the secure application framework 125 running in the trusted execution environment 122. The first random key is then sent in a secure way by sending it to the secure application framework 125 running in the trusted execution environment 122 via the secure channel. The secure channel may be implemented by the trusted execution environment 122 generating a private/public key pair for the channel. The device 140 comprising the secure module 145 may then encrypt data with the public key of the private/public key pair for the channel. In alternative, the device 140 comprising the secure module 145 may use the public key of the private/public key pair for the channel to encrypt a symmetric key generated by the device 140 comprising the secure module 145 and send the encrypted symmetric key to the trusted execution environment 122. Data to be sent using the secure channel may then be encrypted using the symmetric key.

Figure 3:
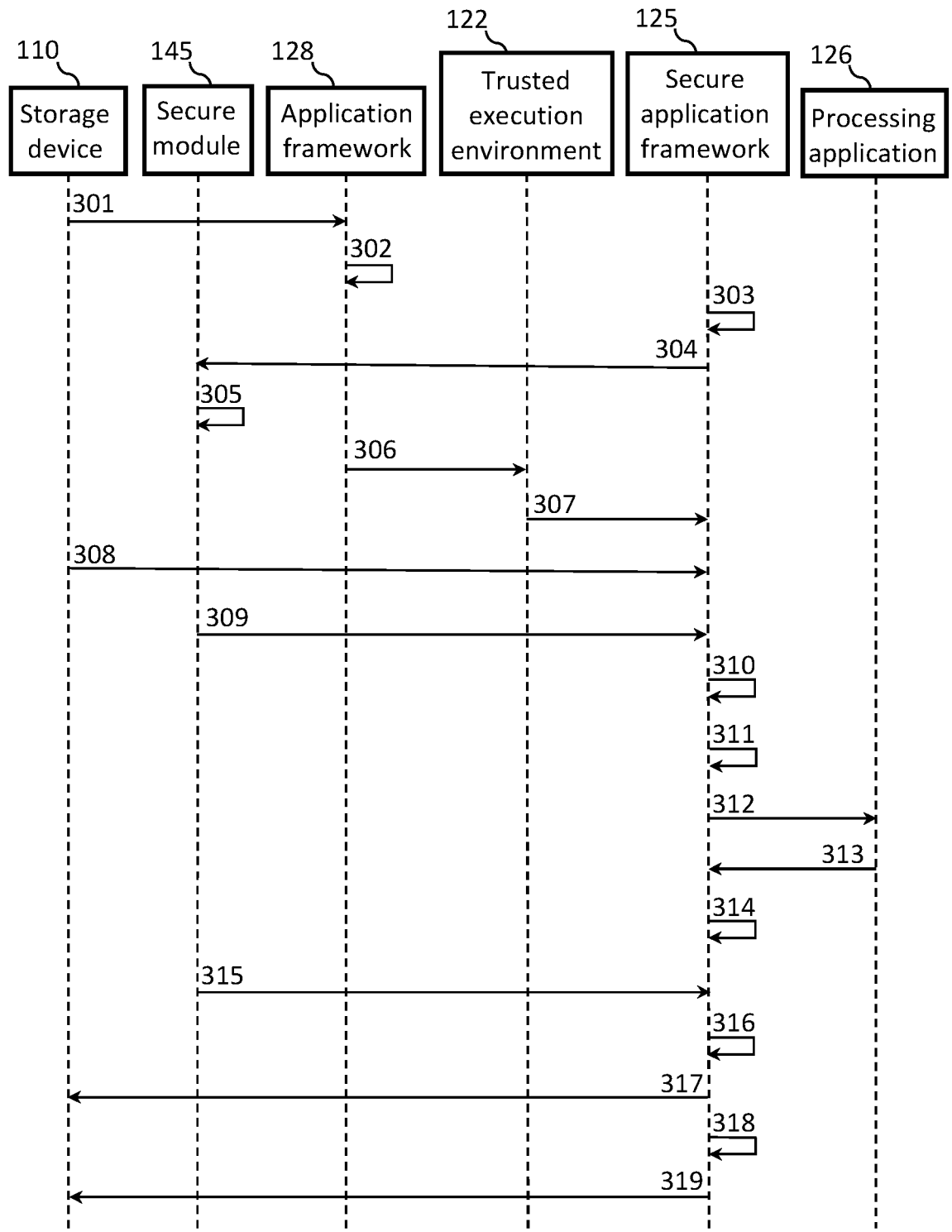
FIG. 3 is a signalling diagram of embodiments of a method for enabling secure processing of data using a processing application configured to process the data.

Embodiments of a computer implemented method for enabling secure processing of data using a processing application 126 configured to process the data will now be described in relation to FIG. 3 showing signalling between different entities in relation to the method. The entities involved are a storage device 110, a secure module 145, an application framework 128, a trusted execution environment 122, a secure application framework 125, and a processing application 126.

The embodiments of the method may for example be implemented in a system as described in relation to FIG. 1. In such a case, a camera 100 has captured and encrypted data in the form of video data or other image data by means of a first random key generated in the camera 100. A private/public key pair for the storage device 110 has been generated in a device, for example in a device 140 comprising the secure module 145, and the public key for the storage device 110 has been provided to the camera 100. The camera 100 has then encrypted the first random key using the public key for the storage device 110 and then preferably thrown away the first random key such that it is no longer available in the camera 100. The encrypted data and the encrypted first random key are then transmitted to, and stored in, the storage device 110. The only way to access the data in decrypted form would then be to decrypt the first random key and then decrypt the encrypted data using the first random key. In order to do so, access to the private key of the storage device 110 held at the secure module 145 is required.

When the data are to be processed by a processing application 126 for which the privacy of the data cannot be ensured, a request is sent 301 to the application framework 128 to start such processing of data using the processing application 126. The request may include the processing application 126, or the processing application 126 may be, or have already been, downloaded from another device, such as a device of a provider of the processing application 126. The application framework 128 is typically configured in the same device as the secure application framework 125 and the trusted execution environment 122. The application framework 128 then prepares 302 instructions to the secure application framework 125 to execute the processing application 126 on the selected data, while also configuring the secure application framework 125 to use the needed encryption keys for decryption of the random key for the selected data and encryption of the random key for the result. By this is meant that the processing application 126 and the secure application framework 125 are configured such that the processing application 126 may only receive and provide data and be executed based on instructions initiated by the secure application framework 125.

Now, in order to access the data, the first random key used to encrypt the data on the storage device 110 is required, and in order to access the first random key, the private key of the storage device 110 is required since the first random key is stored encrypted using the private key of the storage device 110. However, instead of providing the private key of the storage device 110 to the secure application framework 125 in a secure way, alternatives are used such that access to the data is provided without the need to provide the private key of the storage device 110 outside the secure module 145. This is beneficial since the private key of the storage device 110 may be used to encrypt other data which the secure application framework 125 may not be authorized to access. A first way of providing the first random key from the secure module 145 to the secure application framework 125 is by means of a secure channel. A second way is to send the first random key encrypted using a different private/public key pair, e.g., one relating to the processing application 126. Both of these ways have been described hereinabove. In the following, a solution according to the second way is used.

The secure application framework 125 is configured to generate 303 a private/public key pair for the processing application 126. This key pair may be unique for the processing application 126 or it may be the same for a number of processing applications. As the secure application framework 125 is configured to be run in the trusted execution environment 122, it can be ensured that the private key of the processing application 126 is not leaked outside the trusted execution environment 122. The public key for the processing application 126 is then sent 304 from the secure application framework 125 to the secure module 145. The secure module rewraps 305 the first random key using the public key for the processing application 126. This means that the secure module 145 first decrypts the encrypted first random key using the private key for the storage device 110 and then encrypts the first random key using the public key for the processing application 126.

Now the processing application 126 can be run so the application framework indicates 306 to the trusted execution environment 122 that the processing application 126 should be run with reference to the data stored encrypted in the storage device 110. The trusted execution environment 122 then initiates 307 the secure application framework 125 to start the execution of the processing application 126. The secure application framework 125 receives 308 the data encrypted with the first random key from the storage device 110 and receives 309 the rewrapped first random key from the secure module 145. Since the first random key received has been rewrapped using the public key for the processing application 126, the secure application framework 125 can decrypt 310 the first random key using the private key for the processing application 126. Using the first random key, the secure application framework 125 can then decrypt 311 the data using the first random key which has been generated and is held in the secure application framework 125. The decrypted data are then provided 312 to the processing application 126 and the processing application 126 is then executed in the secure application framework 125 running the trusted execution environment 122. Once the processing application 126 has processed the data, output data comprising the result of the processing is received 313 in the secure application framework 125 from the processing application 126.

As not only the data but also the result (output data) of the processing may be sensitive data for which privacy (access) should be controlled, the output data should also be encrypted before transmission outside the trusted execution environment 122. Specifically, the encryption may be such that only parties having access to the original data on the storage device 110 should have access to the result (output data). To this end, a second random key is generated 314 in the secure application framework 125. Furthermore, the public key for the storage device 110 is received 315 in the secure application framework 125 from the secure module 145 and the second random key is encrypted (wrapped in a key file) 316 using the public key of the storage device 110. The encrypted second random key (key file) is then sent 317 to the storage device 110. Finally, the output data are encrypted 318 using the second random key and sent 319 to the storage device 110. As the output data are encrypted using the second random key and the second random key is encrypted using the public key for the storage device 110, only parties having access to the original data on the storage device 110 have access to the output data, i.e., parties that have access to the private key for the storage device 110.

Embodiments of a secure application framework 425, such as the secure application framework 125 as described in relation to FIG. 1, configured to be run in a trusted execution environment, such as the trusted execution environment described in relation to FIG. 1, will now be described in relation to FIG. 4. The embodiments of the secure application framework 425 may for example be implemented in a system as described in relation to FIG. 1.

According to embodiments, the secure application framework 425 is configured to be run in a trusted execution environment 122 and to execute an encrypted data receiving function 430 configured to receive data encrypted using a first random key, a secure key receiving function 432 configured to receive the first random key in a secure way, and a data decrypting function 434 configured to decrypt the encrypted data using the first random key, thereby obtaining the data in a decrypted form. The secure application framework 425 is further configured to execute an inputting function 436 configured to input the data to the processing application 126, an executing function 438 configured to execute the processing application 126 to process the input data, and an output data receiving function 440 configured to receive output data from the processing application 126. The secure application framework 425 is further configured to execute a second random key generating function 442 configured to generate a second random key, an output data encrypting function 444 configured to encrypt the output data using the second random key, a second random key encrypting function 446 configured to encrypt the second random key using a public key of a storage device 110, and a sending function 448 configured to send the encrypted output data and the encrypted second random key to the storage device 110.

In order to receive the first random key in a secure way in the secure key receiving function 432, the secure key receiving function may for example be configured to receive the first random key in encrypted form or via a secure channel.

In a configuration where the first random key is received in encrypted form, the secure application framework 425 is further configured to execute a processing application key generating function 440 configured to generate a private/public key pair for the processing application 126. The secure key receiving function 432 is further configured to receive the first random key encrypted using the public key of the processing application 126, and to decrypt the first random key using the private key of the processing application 126.

In a configuration where the first random key is received via a secure channel, the secure key receiving function 432 is further configured to receive the first random key via the secure channel. Such a secure channel may be established for communication between the device 140 comprising the secure module 145 and the secure application framework 125, 425 running in the trusted execution environment 122. The first random key is then sent in a secure way by sending it to the secure application framework 425 running in the trusted execution environment 122 via the secure channel. The secure channel may be implemented by generating, in the trusted execution environment 122, a private/public key pair for the channel and then the device 140 comprising the secure module 145 may then encrypt data with the public key of the private/public key pair for the channel. Hence, when data, such as the first random key, are to be securely received in the secure application framework 425, they are encrypted using the public key of the private/public key pair for the channel. In alternative, the device 140 comprising the secure module 145 may use the public key of the private/public key pair for the channel to encrypt a symmetric key generated by the device 140 comprising the secure module 145 and send the encrypted symmetric key to the trusted execution environment 122. Data, such as the first random key, to be securely received using the secure channel are then be encrypted using the symmetric key.

The first random key may be received in a secure way from a device 140 comprising a secure module 145 which may be any device including a module that enables handling of sensitive data with a level of security required by the relevant application. By receiving the data in a secure way is meant that the data is received in a way such that the privacy of the data is secured, i.e., such that the data is not leaked in unencrypted form to an unauthorized party. The secure module 145 may for example be a trusted platform module (TPM) or a secure element (SE). The secure module may be realized in hardware or software, or a combination of both.

The secure application framework 425 may further be configured to execute a requesting function 442 configured to request the device 140 comprising the secure module 145 to provide the public key of the storage device 110, and a storage device public key receiving function 444 configured to receive the public key of the storage device 110 from the device 140 comprising the secure module 145.

The functions of the secure application framework 425 may be further adapted and further functions may be added in accordance with corresponding steps of the method 200 described in relation to FIG. 2 and FIG. 3.

Figure 5:
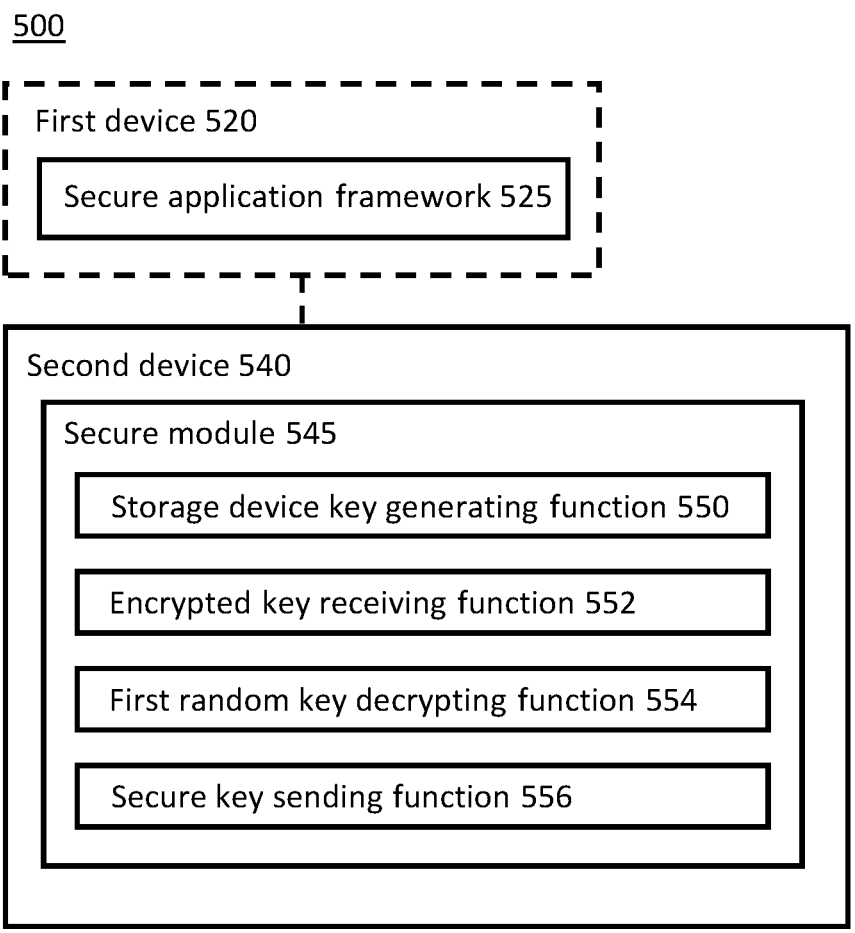
FIG. 5 is a schematic block diagram of embodiments of a system for enabling secure processing of data using a processing application configured to process the data.

Embodiments of a system 500 enabling secure processing of data using a processing application 126 configured to process the data will now be described in relation to FIG. 5. The embodiments of the system 500 may for example be implemented in a system as described in relation to FIG. 1.

Figure 4:
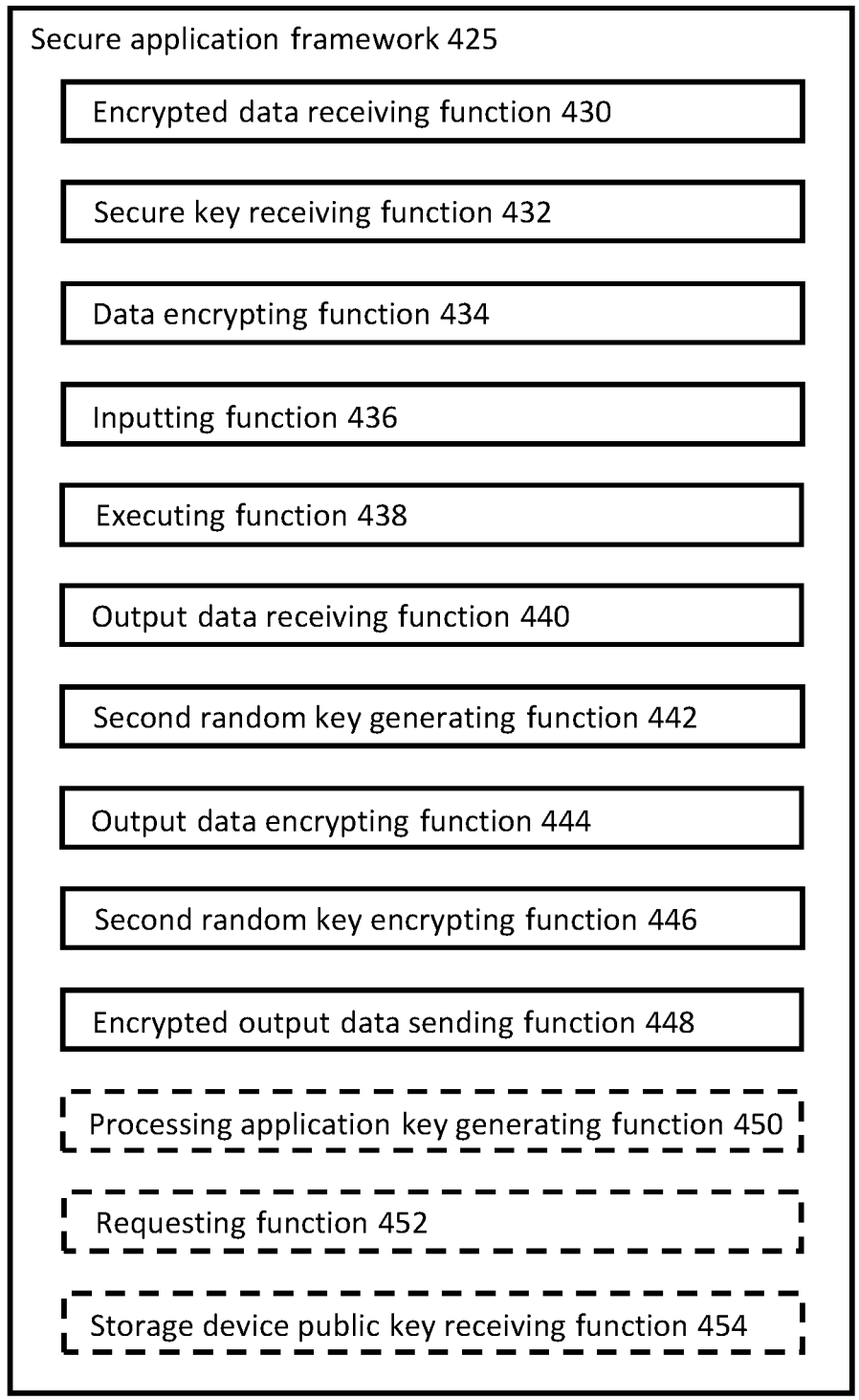
FIG. 4 is a schematic block diagram of embodiments of a secure application framework configured to be run in a trusted execution environment.

The system 500 comprises a secure application framework 525 configured to be run in a trusted execution environment 122, such as the secure application framework 425 as described in relation to FIG. 4 or the secure application framework 125 as described in relation to FIG. 1. The secure application framework 525 may be configured in a first device 520 comprising a processor (not shown) running the trusted execution environment 122.

The system further comprises a second device 540 comprising a secure module 545 configured to execute a storage device key generating function 550 configured to generate a private/public key pair for the storage device 110, and an encrypted key receiving function 552 configured to receive the first random key encrypted using the public key of the storage device 110. The secure module 545 is further configured to execute a first random key decrypting function 554 configured to decrypt the first random key using the private key of the storage device 110, and a secure key sending function 556 configured to send the first random key in a secure way to the secure application framework 525.

The device 540 comprising the secure module 545 may be any device including a module that enables handling of sensitive data with a level of security required by the relevant application. The secure module 545 is a module that is able to manage private/public key pairs in a secure way such that leaking of the public key or other sensitive data to unauthorized parties is prevented.

The secure module 545 may for example be a trusted platform module (TPM) or a secure element (SE). The secure module may be realized in hardware or software, or a combination of both.

The functions of the secure application framework 525 of the system 500 may be further adapted and further functions may be added in accordance with corresponding steps of the method 200 described in relation to FIGS. 2 and 3 and the corresponding functions of the secure application framework 425 described in relation to FIG. 4. The functions of the secure module 545 of the system 500 may be further adapted and further functions may be added in accordance with corresponding steps of the method 200 described in relation to FIG. 2 and FIG. 3.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A computer implemented method for enabling secure processing of data using an untrusted processing application configured to process the data, wherein the computer implemented method is performed within a secure application framework running in a trusted execution environment and controlling all input to and output from the untrusted processing application running in the trusted execution environment, and comprises:
   receiving the data encrypted using a first random key;
   receiving the first random key in a secure way;
   decrypting the encrypted data using the first random key, thereby obtaining the data;
   inputting the data to the untrusted processing application;
   executing the untrusted processing application to process the input data;
   receiving output data from the untrusted processing application, wherein the output data are unencrypted;
   generating a second random key;
   encrypting the output data using the second random key;
   encrypting the second random key using a public key of a storage device;
   sending the encrypted output data and the encrypted second random key to the storage device, wherein the storage device is located outside the trusted execution environment;
   within a device comprising a secure module:
   generating a private/public key pair for the storage device;
   receiving the first random key encrypted using the public key of the storage device;

decrypting the first random key using the private key of the storage device; and sending the first random key in a secure way to the secure application framework, and within the secure application framework running in the trusted execution environment:

generating a private/public key pair for the untrusted processing application, wherein receiving the first random key in a secure way comprises:

receiving the first random key encrypted using the public key of the untrusted processing application; and decrypting the first random key using the private key of the untrusted processing application.

2. The computer implemented method according to claim 1, further comprising:

within the secure application framework running in the trusted execution environment:

sending, to a device comprising a secure module, the public key of the untrusted processing application, and within the device comprising the secure module:

receiving the public key of the untrusted processing application;

encrypting the first random key using the public key of the untrusted processing application; and sending, to the secure application framework, the first random key encrypted using the public key of the untrusted processing application.

3. The computer implemented method according to claim 2, further comprising:

within the device comprising the secure module:

generating a private/public key pair for the storage device;

receiving the first random key encrypted using the public key of the storage device; and decrypting the first random key using the private key of the storage device.

4. The computer implemented method according to claim 1, further comprising:

establishing a secure channel for communication between the device comprising the secure module and the secure application framework running in the trusted execution environment, wherein, within the device comprising the secure module, sending the first random key in a secure way to the secure application framework comprises:

sending the first random key to the secure application framework running in the trusted execution environment via the secure channel.

5. A non-transitory computer-readable storage medium having stored thereon instructions for implementing a method, when executed by a system having processing capabilities, the method for enabling secure processing of data using an untrusted processing application configured to process the data, wherein the method is performed within a secure application framework running in a trusted execution environment and controlling all input to a nd output from the untrusted processing application, wherein the untrusted processing application is running in the trusted execution environment, and wherein the computer implemented method comprises:

receiving the data encrypted using a first random key;
receiving the first random key in a secure way;
decrypting the encrypted data using the first random key, thereby obtaining the data;
inputting the data to the untrusted processing application;
executing the untrusted processing application to process the input data;

receiving output data from the untrusted processing application, wherein the output data are unencrypted;
generating a second random key;
encrypting the output data using the second random key;
encrypting the second random key using a public key of a storage device; and
sending the encrypted output data and the encrypted second random key to the storage device, wherein the storage device is located outside the trusted execution environment;

within a device comprising a secure module:
generating a private/public key pair for the storage device;
receiving the first random key encrypted using the public key of the storage device;
decrypting the first random key using the private key of the storage device; and
sending the first random key in a secure way to the secure application framework, and within the secure application framework running in the trusted execution environment:
generating a private/public key pair for the untrusted processing application,
wherein receiving the first random key in a secure way comprises:
receiving the first random key encrypted using the public key of the untrusted processing application; and
decrypting the first random key using the private key of the untrusted processing application.

6. A device comprising:
a processor and a memory configured to run a trusted execution environment, and
a secure application framework configured to be run in the trusted execution environment, to control all input to and output from an untrusted processing application running in the trusted execution environment, and to execute:
an encrypted data receiving function configured to receive data encrypted using a first random key;
a secure key receiving function configured to receive the first random key in a secure way;
a data decrypting function configured to decrypt the encrypted data using the first random key, thereby obtaining the data;
an inputting function configured to input the data to the untrusted processing application;
an executing function configured to execute the untrusted processing application to process the input data; and
an output data receiving function configured to receive output data from the untrusted processing application, wherein the output data are unencrypted;
a second random key generating function configured to generate a second random key;
an output data encrypting function configured to encrypt the output data using the second random key;
a second random key encrypting function configured to encrypt the second random key using a public key of a storage device;
a sending function configured to send the encrypted output data and the encrypted second random key to the storage device, wherein the storage device is located outside the trusted execution environment;

within a device comprising a secure module:
generating a private/public key pair for the storage device;
receiving the first random key encrypted using the public key of the storage device;
decrypting the first random key using the private key of the storage device; and sending the first random key in a secure way to the secure application framework, and
within the secure application framework running in the trusted execution environment:
generating a private/public key pair for the untrusted processing application,
wherein receiving the first random key in a secure way comprises:
receiving the first random key encrypted using the public key of the untrusted processing application; and
decrypting the first random key using the private key of the untrusted processing application.

7. The device according to claim 6, wherein the secure application framework is further configured to execute:
a processing application key generating function configured to generate a private/public key pair for the untrusted processing application,
wherein the secure key receiving function is further configured to:
receive the first random key encrypted using the public key of the untrusted processing application; and
decrypt the first random key using the private key of the untrusted processing application.

8. The device according to claim 6, wherein the secure key receiving function is further configured to:
receive the first random key via a secure channel.

9. A system comprising:
a first device comprising a processor and a memory configured to run a trusted execution environment, and a secure application framework configured to be run in the trusted execution environment, to control all input to and output from an untrusted processing application running in the trusted execution environment, and to execute:
an encrypted data receiving function configured to receive data encrypted using a first random key;
a secure key receiving function configured to receive the first random key in a secure way;
a data decrypting function configured to decrypt the encrypted data using the first random key, thereby obtaining the data;
an inputting function configured to input the data to the untrusted processing application;
an executing function configured to execute the untrusted processing application to process the input data; and
an output data receiving function configured to receive output data from the untrusted processing application, wherein the output data are unencrypted;
a second random key generating function configured to generate a second random key;
an output data encrypting function configured to encrypt the output data using the second random key;
a second random key encrypting function configured to encrypt the second random key using a public key of a storage device;
a sending function configured to send the encrypted output data and the encrypted second random key to the storage device, wherein the storage device is located outside the trusted execution environment, and
a second device comprising a secure module configured to execute:

a storage device key generating function configured to generate a private/public key pair for the storage device;
an encrypted key receiving function configured to receive the first random key encrypted using the public key of the storage device;
a first random key decrypting function configured to decrypt the first random key using the private key of the storage device; and
a secure key sending function configured to send the first random key in a secure way to the secure application framework,
wherein the secure application framework is further configured to execute:
a processing application key generating function configured to generate a private/public key pair for the untrusted processing application,
wherein the secure key receiving function is further configured to:
receive the first random key encrypted using the public key of the untrusted processing application; and
decrypt the first random key using the private key of the untrusted processing application.

10. The system according to claim 9, wherein the secure application framework is further configured to execute:
a processing application key sending function configured to send, to the device comprising the secure module, the public key of the untrusted processing application,
and wherein the device comprising the secure module further comprises:
a processing application key receiving function configured to receive the public key of the untrusted processing application;
a first random key encrypting function configured to encrypt the first random key using the public key of the untrusted processing application; and
an encrypted first random key sending function configured to send, to the secure a pplication framework, the first random key encrypted using the public key of the untrusted processing application.

11. The system according to claim 10, wherein the device comprising the secure module is further configured to execute:
a storage device key generating function configured to generate a private/public key pair for the storage device;
an encrypted first random key receiving function configured to receive the first random key encrypted using the public key of the storage device; and
a first random key decrypting function configured to decrypt the first random key using the private key of the storage device.

12. The system according to claim 9, further configured to execute:
a secure channel establishing function configured to establish a secure channel for communication between the device comprising the secure module and the secure application framework running in the trusted execution environment,
and wherein the secure key sending function is configured to send the first random key to the secure application framework via the secure channel.

* * * * *